US009544325B2

(12) United States Patent
Foster et al.

(10) Patent No.: US 9,544,325 B2
(45) Date of Patent: Jan. 10, 2017

(54) SOCIAL NETWORK SECURITY MONITORING

(71) Applicant: ZeroFOX, Inc., Baltimore, MD (US)

(72) Inventors: James C. Foster, Baltimore, MD (US); Evan Blair, Baltimore, MD (US); Christopher B. Cullison, Westminster, MD (US); Robert Francis, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

(21) Appl. No.: 14/566,971

(22) Filed: Dec. 11, 2014

(65) Prior Publication Data

US 2016/0173520 A1 Jun. 16, 2016

(51) Int. Cl.
*H04L 29/06* (2006.01)
*G06F 21/31* (2013.01)
*G06Q 10/06* (2012.01)
*G06F 21/55* (2013.01)

(52) U.S. Cl.
CPC ......... *H04L 63/1433* (2013.01); *G06F 21/316* (2013.01); *G06Q 10/0635* (2013.01); *H04L 63/102* (2013.01); *G06F 21/552* (2013.01)

(58) Field of Classification Search
CPC .. G06F 21/552; G06F 21/316; G06Q 10/0635; H04L 63/1433; H04L 63/102
USPC ........................................... 726/24; 705/7.28
See application file for complete search history.

(56) References Cited

U.S. PATENT DOCUMENTS

| | | |
|---|---|---|
| 8,087,084 B1 | 12/2011 | Andruss et al. |
| 8,225,413 B1 | 7/2012 | De |
| 8,234,168 B1 | 7/2012 | Lagle |
| 8,484,744 B1 * | 7/2013 | De .................. G06F 21/6245 726/26 |
| 8,655,899 B2 | 2/2014 | Kenedy |
| 8,732,455 B2 | 5/2014 | Wong et al. |
| 8,782,080 B2 | 7/2014 | Lee et al. |
| 8,782,217 B1 | 7/2014 | Arone |
| 8,909,646 B1 | 12/2014 | Fabrikant et al. |
| 9,027,134 B2 | 5/2015 | Foster et al. |
| 9,055,097 B1 | 6/2015 | Foster et al. |
| 2002/0073086 A1 | 6/2002 | Thompson et al. |
| 2005/0198031 A1 * | 9/2005 | Pezaris ................. H04L 12/588 |
| 2006/0168066 A1 | 7/2006 | Helsper |

(Continued)

FOREIGN PATENT DOCUMENTS

CN 102662950 A 9/2012

OTHER PUBLICATIONS

Office Action issued in U.S. Appl. No. 14/218,522 on Dec. 31, 2014, 13 pages.

(Continued)

*Primary Examiner* — Robert Leung
*Assistant Examiner* — Thomas Ho
(74) *Attorney, Agent, or Firm* — Fish & Richardson P.C.

(57) ABSTRACT

A computer-implemented method includes security settings data associated with one or more profiles of a protected social entity on one or more social networks is scanned, and the security settings data associated with the one or more profiles of the protected social entity is assessed. A first security risk score for the protected social entity is determined based on the assessment of the security settings data, and the first security risk score is provided to the protected social entity.

17 Claims, 4 Drawing Sheets

(56) References Cited

U.S. PATENT DOCUMENTS

| | | | |
|---|---|---|---|
| 2008/0177834 A1 | 7/2008 | Gruhl | |
| 2008/0196099 A1 | 8/2008 | Shastri | |
| 2008/0262877 A1* | 10/2008 | Hargroder | G06Q 40/08 705/4 |
| 2008/0288382 A1 | 11/2008 | Smith | |
| 2008/0300964 A1 | 12/2008 | Raghunandan | |
| 2010/0174813 A1 | 7/2010 | Hildreth | |
| 2010/0241621 A1 | 9/2010 | Randall | |
| 2011/0145279 A1 | 6/2011 | Chunilal | |
| 2011/0167011 A1 | 7/2011 | Paltenghe | |
| 2011/0191200 A1* | 8/2011 | Bayer | G06Q 20/12 705/26.1 |
| 2011/0276396 A1 | 11/2011 | Rathod | |
| 2012/0030732 A1 | 2/2012 | Shaty | |
| 2012/0047560 A1 | 2/2012 | Underwood | |
| 2012/0047581 A1 | 2/2012 | Banerjee | |
| 2012/0159647 A1* | 6/2012 | Sanin | H04L 51/32 726/28 |
| 2012/0167231 A1 | 6/2012 | Garcia | |
| 2012/0180135 A1 | 7/2012 | Hodges | |
| 2012/0191594 A1 | 7/2012 | Welch | |
| 2012/0296845 A1 | 11/2012 | Andrews | |
| 2012/0296965 A1 | 11/2012 | Srivasta | |
| 2013/0085953 A1* | 4/2013 | Bhola | G06Q 50/01 705/319 |
| 2013/0110802 A1 | 5/2013 | Shenoy | |
| 2013/0124538 A1 | 5/2013 | Lee et al. | |
| 2013/0139236 A1 | 5/2013 | Rubinstein et al. | |
| 2013/0239217 A1 | 9/2013 | Kindler | |
| 2013/0268357 A1 | 10/2013 | Heath | |
| 2013/0339186 A1 | 12/2013 | French | |
| 2014/0067656 A1 | 3/2014 | Cohen Ganor et al. | |
| 2014/0123632 A1 | 5/2014 | Shibuya | |
| 2014/0129632 A1 | 5/2014 | Sutton | |
| 2014/0129942 A1 | 5/2014 | Rathod | |
| 2014/0137257 A1 | 5/2014 | Martinez | |
| 2014/0208424 A1 | 7/2014 | Hudack | |
| 2014/0325662 A1 | 10/2014 | Foster et al. | |
| 2014/0337972 A1 | 11/2014 | Foster et al. | |
| 2014/0337973 A1 | 11/2014 | Foster et al. | |

OTHER PUBLICATIONS

Office Action issued in U.S. Appl. No. 14/327,068 on Jan. 26, 2015, 18 pages.

Kontaxis et al., "Detecting Social Network Profile Cloning" http://ieeexplore.ieee.org/stamp/stamp.jsp?tp=&arnumber=5766886&tag=l, pp. 295-300, 2011.

Tchuente et al., "A Community Based Algorithm for Deriving Users' Profiles from Egocentrics Networks" http://ieeexplore.ieee.org/stamp/stamp.jsp?tp=&arnumber=6425752i, 2012, pp. 266-273, 2012.

Office Action issued in U.S. Appl. No. 13/842,716 on Aug. 13, 2014, 12 pages.

Office Action issued in U.S. Appl. No. 14/218,522 on Jul. 8, 2014, 10 pages.

Office Action issued in U.S. Appl. No. 14/327,068 on Aug. 12, 2014, 12 pages.

Office Action issued in U.S. Appl. No. 14/445,274 on Sep. 11, 2014, 11 pages.

Office Action issued in U.S. Appl. No. 14/445,203 on Sep. 18, 2014, 8 pages.

Notice of Allowance issued in U.S. Appl. No. 14/445,203 on Feb. 11, 2015, 7 pages.

Office Action issued in U.S. Appl. No. 13/842,716 on Mar. 23, 2015, 22 pages.

Office Action issued in U.S. Appl. No. 14/445,274 on Apr. 27, 2015, 18 pages.

"How do I report a fake account that's pretending to be me?," Dec. 2012, Retrieved from the Internet <URL: web.archive.org/web/20121226111810/https://www.facebook.com/help/174210519303259>, retrieved on Aug. 12, 2015, 1 page.

Liu et al., "A Framework for Computing the Privacy Scores of Users in Online Social Networking," http://cs-people.bu.edu/evimaria/papers/tkdd-pr.pdf, Dec. 2010, pp. 1-30.

Office Action issued in U.S. Appl. No. 14/327,068 on May 22, 2015, 22 pages.

Office Action issued in U.S. Appl. No. 14/690,804 on Aug. 27, 2015, 34 pages.

Socialimpostor.com, May 2012; Retrieved from the Internet <URL: web.archive.org/web/20120504213219/http://www.socialimpotor.com/>, retrieved on Aug. 12, 2015, 3 pages.

Office Action issued in U.S. Appl. No. 14/445,274 on Sep. 11, 2015, 16 pages.

Office Action issued in U.S. Appl. No. 13/842,716 on Oct. 1, 2015, 20 pages.

Office Action issued in U.S. Appl. No. 14/690,804 on Mar. 11, 2016, 18 pages.

Office Action issued in U.S. Appl. No. 14/690,677 on Mar. 15, 2016, 18 pages.

Office Action issued in U.S. Appl. No. 13/842,716 on Apr. 26, 2016, 26 pages.

Office Action issued in U.S. Appl. No. 14/690,804 on Jun. 17, 2016, 19 pages.

Office Action issued in U.S. Appl. No. 14/690,677 on Jun. 29, 2016, 17 pages.

Office Action issued in U.S. Appl. No. 14/445,274 on Jun. 30, 2016, 19 pages.

Office Action issued in U.S. Appl. No. 14/690,677 on Oct. 8, 2015, 26 pages.

* cited by examiner

SOCIAL NETWORK SECURITY MONITORING

FIELD

The present application relates to computer security.

BACKGROUND

Traditional approaches to combating cyber threats focuses on securing endpoints and networks through reactive security measures that are focused on securing computing (or communication) devices. Anti-virus programs, for example, can be used to detect malicious software associated with local system-level attacks (e.g., a virus attached to an email) and, when defenses have already been breached, to quarantine dangerous files that are detected within a computer system. Firewalls and other edge security devices can be used to establish a perimeter around sensitive systems by controlling the passage of information between networks, so as to reduce the risk of unauthorized interactions.

Modern cyber threats, however, evolve alongside computer technology, and attackers can be expected to leverage whatever means are available in order to compromise or bypass traditional defenses. The development and expansion of social media and social networks, for instance, has introduced significant information security risk to both individuals and organizations. These risks include targeted social-based cyber-attacks, fraud, impersonations, and social engineering, among others.

SUMMARY

A security technology that monitors the security level of social network profiles associated with individuals and/or organizations is described. The security technology may continuously monitor one or more social network profiles of a protected social entity and may evaluate the potential security risks to the protected social entity based on settings associated with the one or more profiles. The security technology may have the capability to alert the protected social entity, and/or to take other appropriate actions, if any perceived increase in the security risk to the protected social entity is detected based on changes to the settings, and to provide corrective changes to the security settings to reduce the security risks.

In one aspect, an authorization to access settings data of one or more social network profiles (which may pertain to one or more social networks) that are associated with a protected social entity is received from the protected social entity. The settings data associated with the one or more profiles of the protected social entity is scanned and assessed. A first security risk score for the protected social entity is determined based on the assessment of the security settings data, and the first security risk score is provided to the protected social entity.

In another aspect, the settings data associated with the one or more profiles of the protected social entity is monitored, and one or more changes in the security settings data are identified. A second security risk score is determined based on an assessment of the changes to the settings data, and the second risk score is provided to the protected social entity.

In yet another aspect, the first security risk score is compared to a threshold, and an alert to the protected social entity is generated if the first risk score exceeds the threshold. A list of changes to the security settings data that may reduce the security risk score is also provided to the protected social entity.

In another aspect, identifying one or more changes in the security settings data comprises identifying one or more changes made by the protected social entity. The first security risk score associated with the protected social entity is stored, and the second risk score associated with the protected social entity is stored. The first and second security risk scores is presented to the protected social entity as a security risk score history.

In yet another aspect, a list identifying one or more profile attributes to monitor is received from the protected social entity, and the one or more profiles of the protected social entity is monitored for changes to the one or more identified profile attributes. A change in one or more of the identified profile attributes is identified, and an alert to the protected social entity is generated.

Other implementations of these aspects include corresponding systems, apparatus, and computer programs, configured to perform the described techniques, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

Predictive and active social risk management technology reduces the risks posed to individuals and enterprises by cyber threats that target and exploit the social vector. Traditional approaches to combating cyber threats focus on endpoint and perimeter security, providing reactive protection through, for example, anti-virus software, email and web gateways, firewalls, and intrusion detection systems. Cyber threats have evolved, however, and attacks now leverage social network and social media communications as means of bypassing traditional protections. The evolving risk necessitates security technology that is predictive and active rather than reactive in nature, and that evaluates the security settings associated with one or more social networks profiles of a protected social entity. The security technology may identify the level of security associated with the one or more profiles and provide changes to the security settings that when made would have the security of the one or more profiles up to a standard that should be efficient to prevent against social threats.

In more detail, a social threat protection tool may monitor the settings of the one or more social network profiles associated with a protected social entity. The social threat protection tool may provide to the protected social entity an evaluation of the overall security of the one or more profiles of the protected social entity. The overall security of the one or more profiles of the protected social entity may be considered as a profile "health check," that assesses the strength and effectiveness of the security settings associated with the one or more profiles. The social threat protection tool may identify, to the protected social entity, changes to the security settings that may increase the security level of the one or more social network profiles. The social threat protection tool may continuously monitor the security settings associated with the one or more profiles of the protected social entity, and notify the protected social entity of any changes to the security settings. The settings data may include profile attributes settings. The user may set one or more profile attributes that should be monitored by the social threat protection tool. In some implementations, the user may indicate if a particular profile attribute provides a security risk to the protected social entity. For example, the user may identify that mentioning the protected social entity's maiden name may be a security risk for the protected social entity.

Figure 1:
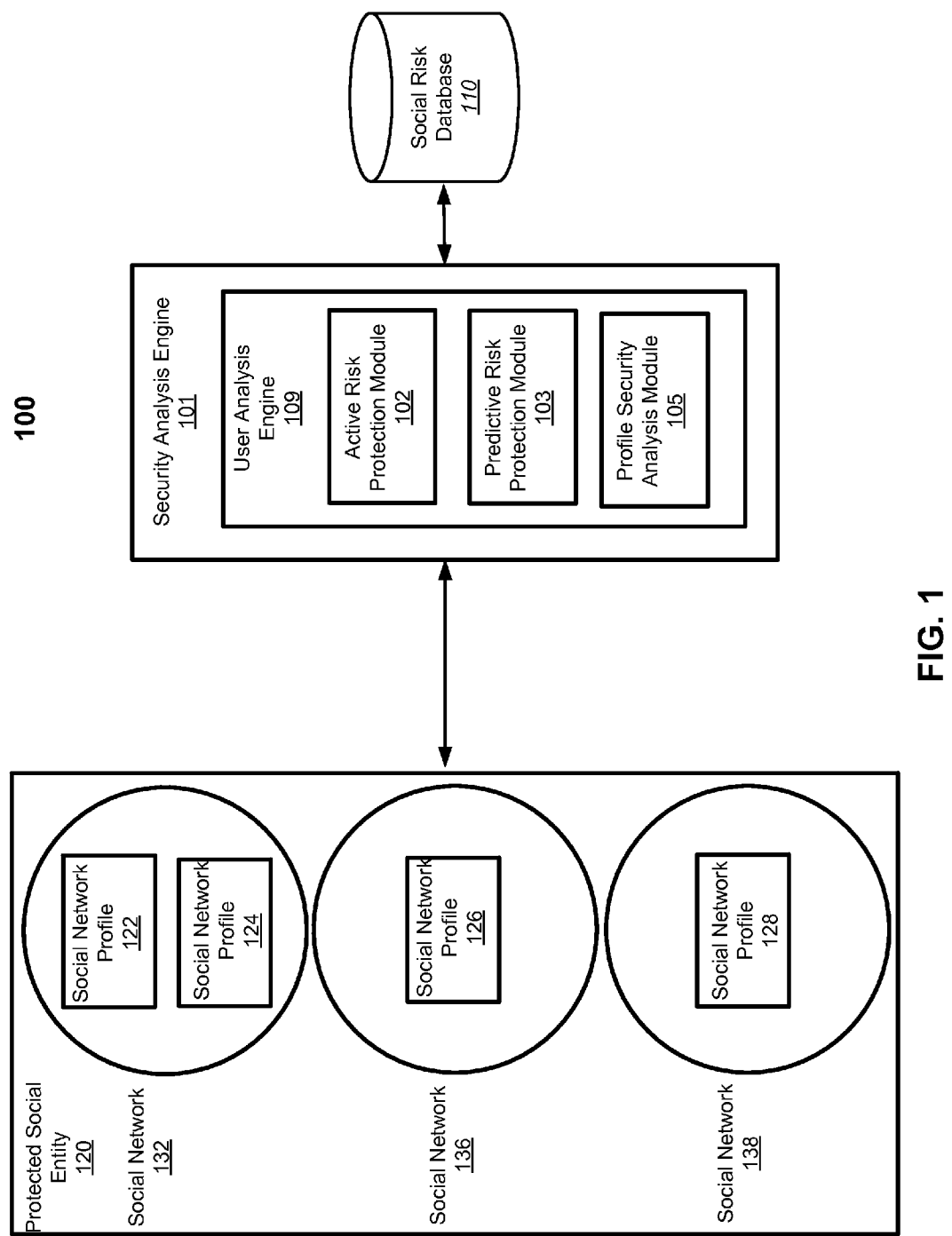
FIG. 1 is a diagram of an example of a system that evaluates the security level associated with one or more social network profiles of a protected social entity.

FIG. 1 is a diagram of an example system 100 that evaluates the security level associated with one or more social network profiles of a protected social entity. The system 100 includes a security analysis engine 101 that includes a user analysis engine 109. The user analysis engine 109 includes an active risk protection module 102, a predictive risk protection module 103, a profile security analysis module 105, as well as a social risk database 110 that is operably coupled to the security analysis engine 101. The active risk protection module 102, the predictive risk protection module 103, and the profile security analysis module 105 of the user analysis engine 109 may be implemented using a single computer, or may instead be implemented using two or more computers that interface through the network. In some implementations, the user analysis engine may include a profile security analysis module 105. In other implementations, the profile security analysis module may be implemented on a separate computer that is in communication through the network to the user analysis engine 109.

Profile security analysis module 105 of the user analysis engine 109 may be used to evaluate the settings associated with the one or more profiles of the protected social entity 120. The protected social entity 120 may have multiple social network profiles, for example 122, 124, 126, and 128, as illustrated in FIG. 1. As described herein, a protected social entity may be an individual or a corporation that seeks protection for one or more social network profiles by the social threat protection tool. For example, Jane Roe, may maintain a Twitter account, a Facebook account, and an eHarmony account, and may seek protection for each of her social profiles. In some examples, where the protected social entity is a corporation, for example, a government agency, a university, a non-profit organization, a military establishment, or any other suitable corporation, the corporation may seek protection for the one or more profiles of one or more employees or members of the corporation. Acme Inc., for example, may be a social entity that seeks to protect one or more social network profiles associated with the employees of its corporation. The social threat protection tool may monitor the security settings of the one or more social network profiles associated with a protected social entity, and provide to the protected social entity an evaluation of the overall security settings or a "health check" of the one or more social network profiles. Providing an initial "health check" to the protected social entity at the initial step of setting up an account on a social network helps to proactively protect the user from the security risks that may occur while using the social network.

The profile security analysis module 105 may determine a security risk score for the protected social entity 120 based on the evaluation of the settings associated with the one or more social networks profiles of the protected social entity. In some implementations, where the protected social entity is a corporation, each social network profile 122-128 may be associated with an individual employee of the protected social entity 120, and the social threat protection tool may assign an "enterprise" security risk score for the protected social entity 120. The enterprise security risk score may be generated as a cumulative score that factors in individual risk scores of the social network profiles of all the employees of the corporation. In other implementations, only the social network profiles of selected employees of the protected social entity 120 (e.g., the chief executive officer, the chief operating office, the chief financial officer, the chief marketing officer, the chief network administrator, etc.) may be used in generating the cumulative enterprise security risk score for the protected social entity 120.

The determination of the security risk score may be driven by, for example, a scoring algorithm that may determine a risk score based on the level of security of the security settings associated with the one or more profiles of the protected social entity. For example, the profile security analysis module may scan the security settings of the Facebook profile associated with the protected social entity. The profile security analysis module may evaluate one or more security settings or security factors, such as, the uniqueness of the user name used, the strength of the password, the privacy of the profile, that is who is allowed to view the profile, who is allowed to post to the profile, the number of associations or friends on the profile, and any other suitable security setting. The profile security analysis engine may assign a score based on the level of security of each security setting or security factor. The security risk score may be based on a weighted average of the score of each security setting or security factor. In some implementations, the profile security analysis module may determine a security risk score for the protected social entity for an individual social network profile. For example, the profile security analysis module may determine a security risk score for the protected entity's Twitter account. In other implementations, the profile security analysis module may determine a security risk score for the one or more profiles associated with the protected entity.

The profile security analysis module 105 may receive authorization to access the security settings data of one or more social network profiles associated with the protected social entity 120. The profile security analysis module 105 may periodically or substantially periodically monitor the security settings data associated with one or more social network profiles of the protected social entity 120. In some instances, the profile security analysis module of the user analysis engine 109 may identify one or more changes in the security settings data, and generate a second security risk score based on the changes. The profile security analysis module 105 of the user analysis engine 109 may store the second security risk score, a time stamp associated with the second security risk score and the pre-determined security risk threshold value in the social risk database 110. The profile security analysis module 105 may compare the first security risk score to a pre-determined threshold. In some instances, the profile security analysis module 105 can generate based on the comparison, an alert signal that is transmitted to the protected security entity 120 if the first risk score exceeds the pre-determined threshold. In such instances, the profile security analysis module 105 can also send a signal to the protected social entity 120 that includes representations of suggestive corrective actions the protected social entity 120 can implement to reduce the security risk level actions (i.e., a list of changes to the security setting data that can reduce the first security risk score).

In some implementations, the profile security analysis module 105 can provide the protected social entity with data representing a list of different security risk scores determined at different time periods that can also include the reasons behind the specific security risk score generation (e.g., state of social networks, social network profiles, device configurations, operating systems used in the different communication devices of a protected social entity, etc.). Such "historical" security risk scores can allow the protected social entity 120 to perform statistical analysis and other data analytics on the historical security risk score levels and the corresponding system configurations for system design and optimization applications.

Figure 2:
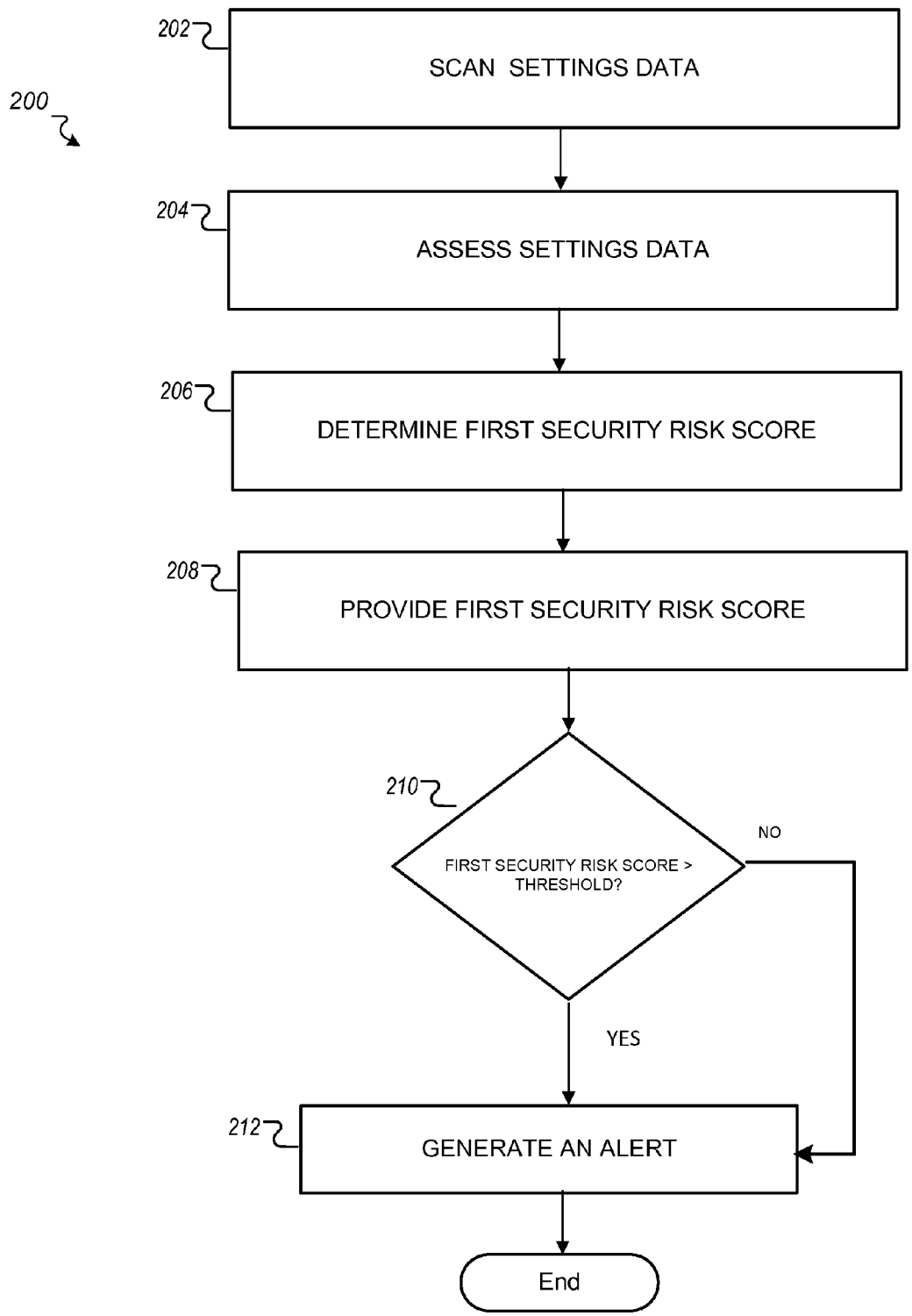
FIG. 2 is a flowchart of an example of a process for determining a security risk score for a protected social entity.

FIG. 2 is a flowchart of an example of a process 200 for determining a security risk score for a protected social entity. The process 200 may be implemented, for example, using system 100, although other systems or configurations may be used. In such an implementation, one or more parts of the process 200 may be executed by the profile security analysis module 105 of the security analysis engine 101, which may interface with other communication devices through a network.

Process 200 begins when profile security analysis module 105 scans the settings data associated with one or more profiles of a protected social entity on or more social networks (202). The one or more profiles may be one or more social network profiles associated with an individual protected social entity. For example, the profile security analysis module may scan the security settings data associated with the LinkedIn Profile, Facebook Profile, and Instagram profile of John Doe. The one or more profiles may be one or more social network profiles associated with a corporation. For example, the profile security analysis module may scan the security settings data associated with the one or more social network profiles of the employees of a corporation. The settings data may include security settings data, for example, the password setting of a profile, the login ID, the user name, the number of password attempts allotted for sign in, the security questions used when a user cannot remember a password, the privacy of a profile (i.e. who is allowed to view and/or who is allowed to post to the one or more profiles), the contact information listed on a social network profile, the number of contacts or associations associated with the profile, or any other suitable security settings data associated with a social network profile. The settings data may include one or more profile attributes, for example, the information displayed on the one or more profiles associated with the protected social entity, the images, posted content, or any other suitable profile attribute.

The profile security analysis module 105 may assess the settings data associated with one or more social network profiles of the protected social entity (204). The profile security analysis module may assess the security settings data associated with the one or more social network profiles of the protected entity by comparing the scanned security settings data to an expert modeled profile with high security. In some implementations, the profile analysis module may generate references to the scanned security settings data from the one or more social networks of the protected social entity, and compare the generated references to stored references of the security settings of the expert modeled profile.

The profile security analysis module may assess the scanned settings data to evaluate a level of security provided by the one or more security settings. In some implementations, the profile security analysis module may assess the security settings data using a scoring algorithm that assigns a score to each of the one or more security settings. The score assigned to each of the one or more security settings may reflect the level of security provided by the setting. For example, the profile security analysis module may assign a score of 5 out of 10 to the password strength security setting, indicating that the password strength has a medium security level. In another example, the profile security analysis module may assign a score of 9/10 to the privacy security setting, indicating that the privacy setting has a high security level.

The profile security analysis module 105 may determine a first security risk score for the protected social entity based on the assessment of the settings data (206). In some implementations, the profile security analysis module may determine a first security risk score based on the comparison between the stored references of the security settings of the expert modeled profile to the generated references. The profile security analysis module may determine a first score based on mapping to a score rating, the comparison of the generated references to the security settings to the stored references of the expert modeled profile. In some implementations, the profile security analysis module may determine a first security score by calculating a weighted average of the scores assigned to each of the one or more security settings. As described above, in some instances, each social network profile associated with an individual protected social entity may be assigned a risk score. In some implementations, a cumulative risk score may be assigned to the individual based on the assessment of each of the one or more social network profiles associated with the individual. An enterprise security risk score may be determined when the protected social entity is a corporation. The enterprise security risk score may include the assessment of the one or more social network profiles of one or more employees of the corporation. For example, the enterprise risk score may reflect the assessment of the one or more social profiles of the corporation's chief executive officer, the chief operating office, the chief financial officer, and the chief marketing officer, the chief network administrator.

After generating the first security risk score, the profile security analysis module 105 may provide the first security risk score to the protected social entity (208). The first security risk score may be provided to the protected social entity that is subscribed to the social threat protection tool. When the protected social entity subscribes to the social threat protection tool, the protected social entity may gain access to a social threat protection tool platform. The protected social entity may provide authorization to the social threat protection tool to access the security settings of one or more social networks profiles of the protected social entity. The first security risk score may be provided to the protected social entity as a web-based alert through the social protection tool platform. In some implementations, the first security risk score may be provided as an email, or as a text message on a mobile device of the protected social entity.

The security profile analysis module 105 may compare the first security risk score to a threshold to determine whether the first security risk score exceeds the threshold (210). If the first security risk score exceeds the threshold, the profile analysis module may generate an alert to the protected social entity (212). The alert may be a web-based alert through the social protection tool platform. In some implementations, the alert may be provided as an email, or as a text message on the mobile device of the protected social entity. In some implementations, the protected social entity may be provided with visual alerts through the social threat protection tool that may identify a first security risk score that is greater than the threshold with a red flag, and may identify a first security risk score that is below the threshold with a green flag. The profile security analysis module may recommend appropriate changes to the security settings of the one or more social network profiles associated with the protected social entity that may be made to lower the security risk score below the threshold.

Figure 3:
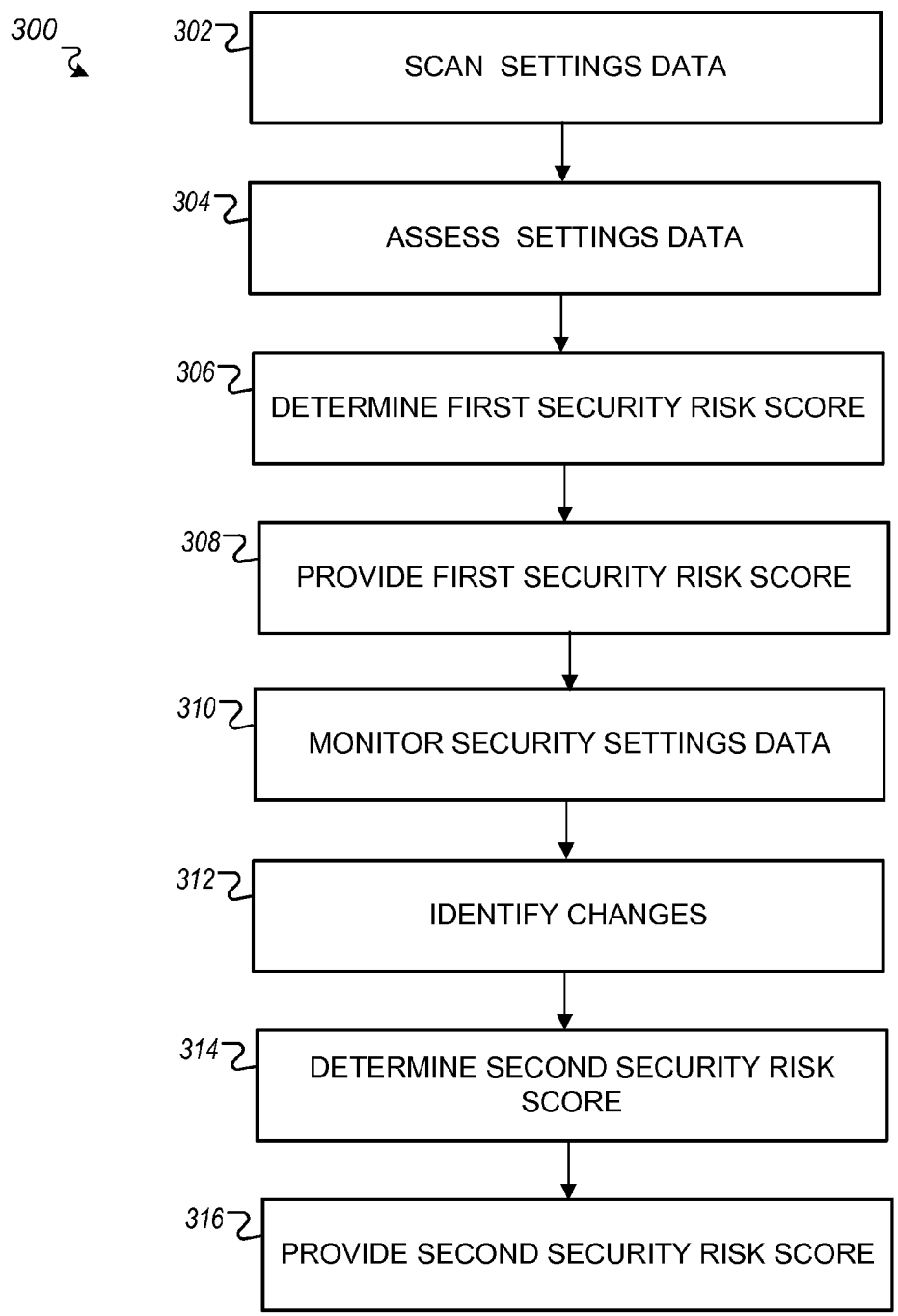
FIG. 3 is a flowchart of an example of a process for continuously monitoring the risks of the one or more social network profiles associated with a protected social entity.

FIG. 3 is a flowchart of an example of a process 300 for continuously monitoring the security risks of the one or more social network profiles associated with a protected social entity. The process 300 may be implemented, for example, using system 100, although other systems or configurations may be used. In such an implementation, one or more parts of the process 300 may be executed by the profile security analysis module of the security analysis engine 101, which may interface with other computers through a network.

Process 300 begins when profile security analysis module 105 scans the settings data associated with one or more profiles of a protected social entity on or more social networks (302). The one or more profiles may be one or more social network profiles associated with an individual protected social entity. For example, the profile security analysis module may scan the security settings data associated with the LinkedIn Profile, Facebook Profile, and Instagram profile of John Doe. The one or more profiles may be one or more social network profiles associated with a corporation. For example, the profile security analysis module may scan the security settings data associated with the one or more social network profiles of the employees of a corporation. The settings data may include, the security settings data, for example, the password setting of a profile, the login ID, the user name, the number of password attempts allotted for sign in, the security questions used when a user cannot remember a password, the privacy of a profile (i.e. who is allowed to view and/or who is allowed to post to the one or more profiles), the contact information listed on a social network profile, the number of contacts or associations associated with the profile, or any other suitable security settings data associated with a social network profile.

The profile security analysis module 105 may assess the settings data associated with one or more social network profiles of the protected social entity (304). The profile security analysis module may assess the security settings data associated with the one or more social network profiles of the protected entity by comparing the scanned security settings data to an expert modeled profile with high security. In some implementations, the profile analysis module may generate references to the scanned data from the one or more social networks of the protected social entity, and compare the generated references to stored references of the security settings of the expert modeled profile.

The profile security analysis module may assess the scanned security settings data to evaluate a level of security provided by the one or more security settings. In some implementations, the profile security analysis module may assess the security settings data using a scoring algorithm that assigns a score to each of the one or more security settings. The score assigned to each of the one or more security settings may reflect the level of security provided by the setting. For example, the profile security analysis module may assign a score of 5 out of 10 to the password strength security setting, indicating that the password strength has a medium security level. In another example, the profile security analysis module may assign a score of 9/10 to the privacy security setting, indicating that the privacy setting has a high security level.

The profile security analysis module 105 may determine a first security risk score for the protected social entity based on the assessment of the settings data (306). In some implementations, the profile security analysis module may determine a first security risk score based on the comparison between the stored references of the security settings of the expert modeled profile to the generated references. The profile security analysis module may determine a first score based on mapping to a score rating, the comparison of the references to the security settings to a score rating. In some implementations, the profile security analysis module may determine a first security score by calculating a weighted average of the scores assigned to security settings. As described above, in some instances, each social network profile associated with an individual protected social entity may be assigned a risk score. In some implementations, a cumulative risk score may be assigned to the individual based on the assessment of each of the one or more social network profiles associated with the individual. An enterprise security risk score may be determined when the protected social entity is a corporation. The enterprise security risk score may include the assessment of the one or more social network profiles of one or more employees of the corporation. For example, the enterprise risk score may reflect the assessment of the one or more social profiles of the corporation's chief executive officer, the chief operating office, the chief financial officer, and the chief marketing officer, the chief network administrator.

After generating the first security risk score, the security profile analysis module 105 may provide the first security risk score to the protected social entity (308). The first security risk score may be provided to the protected social entity that is subscribed to the social threat protection tool. When the protected social entity subscribes to the social threat protection tool, the protected social entity may gain access to a social threat protection tool platform. The protected social entity may provide authorization to the social threat protection tool to access the security settings of one or more social networks profiles of the protected social entity. The first security risk score may be provided to the protected social entity as a web-based alert through the social protection tool platform. In some implementations, the first security risk score may be provided as an email, or as a text message on a mobile device of the protected social entity.

The profile security analysis module may monitor the settings data associated with the one or more profiles of the protected social entity (310). In some implementations, the profile security analysis module may continuously monitor the security settings data associated with the one or more profiles of the protected social entity to identify any changes that may affect the security level of the one or more profiles. In some implementations, the security settings data of the one or more social network profile associated with the protected social entity may be monitored by the profile security analysis module at periodic or substantially periodic time intervals. In other instances, the security settings of the one or more social network profile associated with the protected social entity may be monitored by the profile security analysis module at random time intervals.

The profile security analysis module may identify one or more changes in the settings data (312). The profile security analysis module may monitor the one or more social network profiles of the protected social entity for any changes that may affect the security level of the profiles. The profile security analysis module may monitor the security settings data for settings that may have been changed by the protected social entity. For example, the protected social entity may change his/her password. The profile security analysis module may monitor the security settings data for settings that may have been changed by the host social network. For example, eHarmony may change the privacy settings on the network to allow all other users to view the profile of users, instead on allowing only connections of the user to view the profile. The profile security analysis module may identify the change in the protected social entity's password, and/or the change to the privacy settings on eHarmony to affect the security level of the profile of protected social entity.

After identifying the one or more changes to the settings data, the profile security analysis module may determine a second security risk score (314). The profile security analysis module may assess the changed security settings data and based on the assessment generate the second security risk score. In some implementations, the profile security analysis module may use a scoring algorithm to assign a score to each of the one or more security settings. In some implementations, the profile security analysis module may assign a new score only to the changed security setting and use the previously assigned scores of all the other security settings. In these implementations, the profile security analysis module may determine the second security risk score by calculating a weighted average of the scores assigned to each of the one or more security settings. In some other implementations, the profile security analysis module may generate one or more references to the one or more changed security settings, and compare the generated references to stored references of the security settings of the expert modeled profile. The profile security analysis module may determine the second security risk score based on mapping to a score rating, the comparison of the generated references to the security settings to the stored references of the expert modeled profile.

The profile security analysis module may provide the second security risk score to the protected social entity (316). The second security risk score may be provided to the protected social entity that is subscribed to the social threat protection tool. When the protected social entity subscribes to the social threat protection tool, the protected social entity may gain access to a social threat protection tool platform. The protected social entity may provide authorization to the social threat protection tool to access the security settings of one or more social networks profiles of the protected social entity. The second security risk score may be provided to the protected social entity as a web-based alert through the social protection tool platform. In some implementations, the second security risk score may be provided as an email, or as a text message on a mobile device of the protected social entity.

The protected social entity may use the social security platform tool to view a security score history. The security score history may include the first and second security risk score determined for the protected social entity. The security risk score history may further include a third, fourth and any other subsequent security risk score that may be determined for the protected social entity based on subsequent changes to the security settings of the one or more social network profiles associated with the protected social entity. In some implementations, the security score history may include a list of the one or more changes made to the security settings that caused the determination of a subsequent security risk score.

Figure 4:
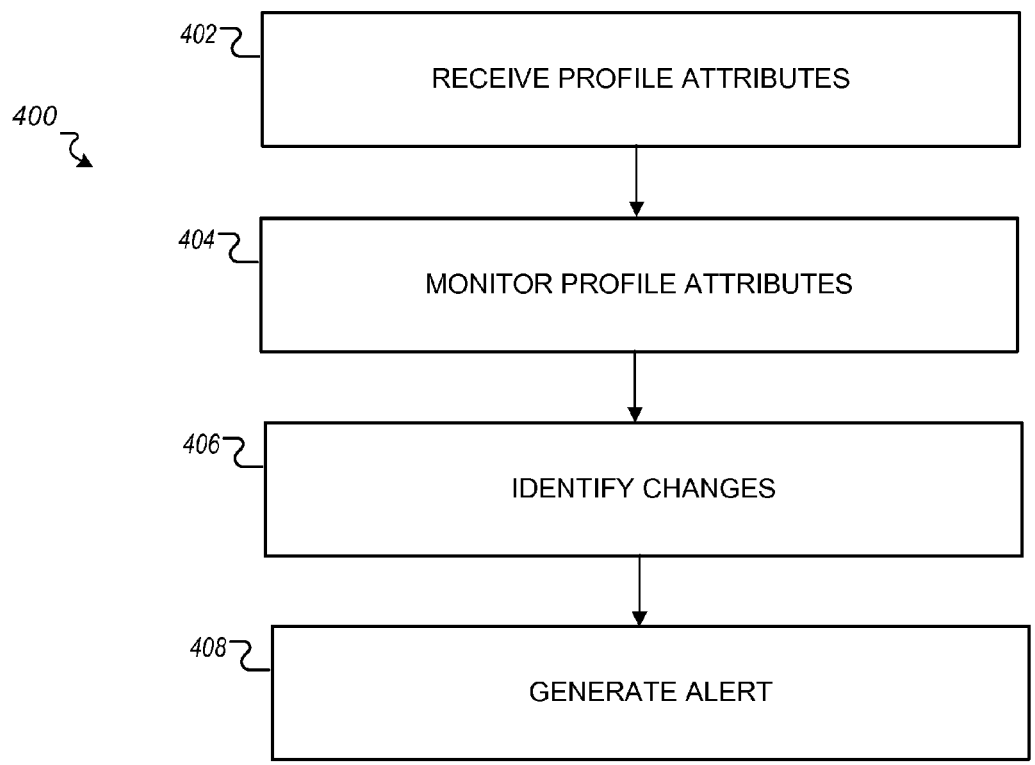
FIG. 4 is a flowchart of an example of a process for generating an alert based on identifying changes to one or more profile attributes.

FIG. 4 is a flowchart of an example of a process 400 for generating an alert based on identifying changes to one or more profile attributes. The process 400 may be implemented, for example, using system 100, although other systems or configurations may be used. In such an implementation, one or more parts of the process 400 may be executed by the profile security analysis module of the security analysis engine 101, which may interface with other communication devices through a network.

Process 400 begins when the profile security analysis module of the security analysis engine receives a list that identifies one or more profile attributes to monitor, from the protected social entity (402). The protected social entity may use the social threat protection platform tool to identify profile attributes that should be monitored. For example, where the protected social entity is a corporation, an authorized user at the corporation may identify one or more profile attributes that should be monitored across the social network profiles for one or more employees at the corporation. The authorized user may identify the profile pictures of the one or more social networks associated with the members of the board of directors of the corporation be monitored For example, the authorized user may indicate that the use of a competitor's logo as the profile picture of one of the protected social profiles should generate an alert. For another example, the authorized user may indicate that any obscene or offensive language posted on a protected social profile should generate an alert. In examples, where the protected social entity is an individual, the user may indicate that any changes to a profile picture should generate an alert, or any changes to the number of contacts or followers should generate an alert. In some implementations, the protected social entity may indicate to generate an alert if a specific social entity is trying to connect with any of the one or more profiles of protected social entity. For example, John Doe may indicate to generate an alert of his ex-finance Jill Ray attempts to communicate with or otherwise associate with any of his social network profiles. In some implementations, the protected social entity may indicate that an alert should be generated if one of the social networks has made a change to its security and privacy settings. In some other implementations, the protected social entity may indicate that an alert should be generated if the protected social entity has a large number of friends or followers that have been identified as bots and or impersonators.

The profile security analysis module may monitor the one or more profiles of the protected social entity for changes to the one or more identified profile attributes (404). In some implementations, the profile security analysis module may continuously monitor the identified profile attributes associated with the one or more profiles of the protected social entity to identify any changes to the attributes. In some implementations, the profile attributes may be monitored by the profile security analysis module at periodic or substantially periodic time intervals.

The profile security analysis module may identify a change to one or more of the identified attributes (406). The profile security analysis module may generate an alert to the protected social entity based on identifying a change to one or more of the identified attributes (408). The alert may be a web-based alert through the social protection tool platform. In some implementations, the alert may be provided as an email, or as a text message on the mobile device of the protected social entity. In some implementations, the alert may include the identified change in the profile attribute.

A number of implementations have been described. Nevertheless, it will be understood that various modifications may be made without departing from the spirit and scope of the disclosure.

In addition, logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The described device and techniques may be implemented in any material and using any process capable of forming the described structures and of performing the described actions. The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   scanning, by one or more processors, security settings data associated with one or more profiles of a protected social entity on one or more social networks, wherein the security settings data is selected from a group consisting of a password strength, a password uniqueness, and a profile privacy;
   assessing the security settings data associated with the one or more profiles of the protected social entity, wherein assessing the security settings data comprises comparing the security settings associated with the one or more profiles of the protected social entity to one or more security settings associated with an expert modeled profile;
   determining based on the assessment of the security settings data, a first security risk score for the protected social entity;
   providing the first security risk score to the protected social entity;
   monitoring the security settings data associated with the one or more profiles of the protected social entity;
   identifying one or more changes in the security settings data;
   determining based on an assessment of the changed security settings data, a second security risk score;
   providing the second security risk score to the protected social entity;
   determining one or more changes to the security settings data that lowers the second security score; and
   providing, to the protected social entity, a list of the one or more changes to the security settings data that lowers the second security score.

2. The method of claim 1 further comprising:
   comparing the first security risk score to a threshold; and
   generating, based on the comparison, an alert to the protected social entity if the first risk score exceeds the threshold.

3. The method of claim 1 further comprising:
   receiving from the protected social entity, authorization to access the security settings data of one or more social network profiles associated with the protected social entity.

4. The method of claim 1 wherein the one or more profiles of the protected social entity are profiles across one or more social networks.

5. The method of claim 1 wherein identifying one or more changes in the security settings data comprises identifying one or more changes made by a social network.

6. The method of claim 1 wherein identifying one or more changes in the security settings data comprises identifying one or more changes made by the protected social entity.

7. The method of claim 1 further comprising:
   storing the first security risk score associated with the protected social entity;
   storing the second risk score associated with the protected social entity; and
   presenting the first and second security risk scores to the protected social entity as a security risk score history.

8. The method of claim 1 further comprising:
   receiving from the protected social entity a list identifying one or more profile attributes to monitor; and
   monitoring the one or more profiles of the protected social entity for changes to the one or more identified profile attributes.

9. The method of claim 8 further comprising:
identifying a change to one or more of the identified profile attributes; and
generating, based on identifying a change, an alert to the protected social entity.

10. A system comprising:
one or more processing devices; and
one or more non-transitory computer-readable media coupled to the one or more processing devices having instructions stored thereon which, when executed by the one or more processing devices, cause the one or more processing devices to perform operations comprising:
scanning, by one or more processors, security settings data associated with one or more profiles of a protected social entity on one or more social networks, wherein the security settings data is selected from a group consisting of a password strength, a password uniqueness, and a profile privacy;
assessing the security settings data associated with the one or more profiles of the protected social entity, wherein assessing the security settings data comprises comparing the security settings associated with the one or more profiles of the protected social entity to one or more security settings associated with an expert modeled profile;
determining based on the assessment of the security settings data, a first security risk score for the protected social entity;
providing the first security risk score to the protected social entity;
monitoring the security settings data associated with the one or more profiles of the protected social entity;
identifying one or more changes in the security settings data;
determining based on an assessment of the changed security settings data, a second security risk score;
providing the second security risk score to the protected social entity;
determining one or more changes to the security settings data that lowers the second security score; and
providing, to the protected social entity, a list of the one or more changes to the security settings data that lowers the second security score.

11. The system of claim 10 further comprising:
comparing the first security risk score to a threshold; and
generating, based on the comparison, an alert to the protected social entity if the first risk score exceeds the threshold.

12. The system of claim 10 further comprising:
receiving from the protected social entity, authorization to access the security settings data of one or more social network profiles associated with the protected social entity.

13. The system of claim 10 wherein the one or more profiles of the protected social entity are profiles across one or more social networks.

14. The system of claim 10 wherein identifying one or more changes in the security settings data comprises identifying one or more changes made by a social network.

15. The system of claim 10 further comprising:
storing the first security risk score associated with the protected social entity;
storing the second risk score associated with the protected social entity; and
presenting the first and second security risk scores to the protected social entity as a security risk score history.

16. A non-transitory computer-readable storage medium storing software comprising instructions executable by one or more computers which, upon such execution, cause the one or more computers to perform operations comprising:
scanning, by one or more processors, security settings data associated with one or more profiles of a protected social entity on one or more social networks, wherein the security settings data is selected from a group consisting of a password strength, a password uniqueness, and a profile privacy; and
assessing the security settings data associated with the one or more profiles of the protected social entity, wherein assessing the security settings data comprises comparing the security settings associated with the one or more profiles of the protected social entity to one or more security settings associated with an expert modeled profile;
determining based on the assessment of the security settings data, a first security risk score for the protected social entity;
providing the first security risk score to the protected social entity;
monitoring the security settings data associated with the one or more profiles of the protected social entity;
identifying one or more changes in the security settings data;
determining based on an assessment of the changed security settings data, a second security risk score;
providing the second security risk score to the protected social entity;
determining one or more changes to the security settings data that lowers the second security score; and
providing, to the protected social entity, a list of the one or more changes to the security settings data that lowers the second security score.

17. The method of claim 1 wherein expert modeled profile is a modeled profile with a high level of security.

* * * * *